J. DE HAVEN.
NUT LOCK.
APPLICATION FILED JAN. 23, 1911.
1,013,866.
Patented Jan. 9, 1912.
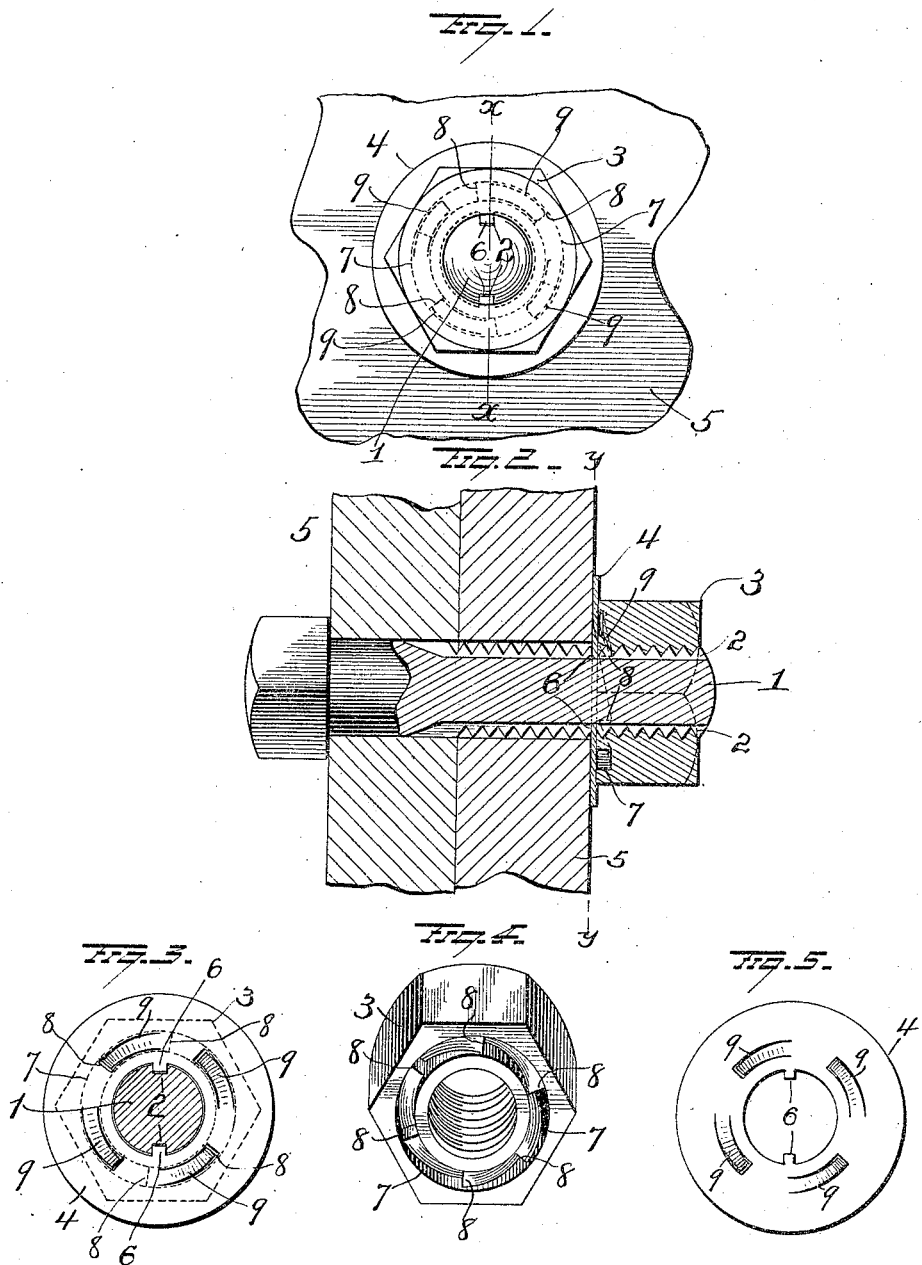
WITNESSES
E. J. Nottingham
G. F. Downing
INVENTOR
J. De Haven
By H. A. Seymour
Attorney

UNITED STATES PATENT OFFICE.

JAMES DE HAVEN, OF DANTE, VIRGINIA, ASSIGNOR OF ONE-HALF TO WILLIAM R. JENNING OF DANTE, VIRGINIA.

NUT-LOCK.

1,013,866. Specification of Letters Patent. Patented Jan. 9, 1912.

Application filed January 23, 1911. Serial No. 604,201.

*To all whom it may concern:*

Be it known that I, JAMES DE HAVEN, of Dante, in the county of Russell and State of Virginia, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks and more particularly to that class employing a disk or washer provided with spring dogs to engage shoulders in the base of a nut,—the object of the invention being to so construct a nut lock of the type specified that a maximum number of adjustments of the nut with a minimum number of dogs on the disk and shoulders on the nut, can be effected, and so that some of the dogs on the disk will rest idly, while the remaining dogs will be in active engagement with shoulders on the nut to lock the latter.

With this object in view the invention consists in certain novel features of construction and combinations of parts as hereinafter set forth and pointed out in the claim.

In the accompanying drawings, Figure 1 is an elevation partly broken away illustrating my improvements. Fig. 2 is a transverse sectional view on the line $x$—$x$ of Fig. 1. Fig. 3 is a sectional view on the line $y$—$y$ of Fig. 2. Fig. 4 is a rear face view of the nut, and Fig. 5 is a face view of the washer 4.

1 represents a threaded bolt provided with longitudinal grooves 2 and 3 represents a nut on the bolt. A disk or washer 4 is disposed between the inner face of the nut and the object 5 through which the bolt passes, said disk or washer being provided with inwardly projecting lugs 6 to enter the longitudinal grooves in the bolt to prevent said disk from turning. The nut 3 is provided in its inner face with an annular series of deep notches 7, at one end of each of which a shoulder 8 is formed to be engaged by dogs 9 projecting from the disk or washer 4. The dogs 9 are made integral with the disk or washer 4,—being stamped therefrom and bent laterally thus forming spring dogs. The spring dogs 9 are so arranged or spaced apart with relation to the spacing apart of the shoulders 8 formed by the notches 7 in the nut, that some of said spring dogs will engage said shoulders while the others will rest idly in the adjacent notches 7 in the nut without engagement with the shoulders 8 which form the end walls of such notches.

In the drawings I have shown the washer as being provided with four spring dogs and the nut as having six notches and a corresponding number of shoulders 8. With such construction, two spring dogs 9 which are diametrically opposite each other will be in engagement with two of the shoulders 8 while the remaining two spring dogs of the washer or disk will rest idly in two of the remaining notches 7. When it shall become necessary or desirable to re-adjust the nut on the bolt, the previously idle dogs will be in condition to promptly enter notches of the nut and engage shoulders 8 at the ends of such notches.

Having fully described my invention what I claim as new and desire to secure by Letters-Patent, is,—

The combination with a threaded bolt and a nut provided on its inner face with a series of annularly arranged notches which are gradually inclined from the surface of the nut to their dog engaging shoulders, of a metal washer provided with a series of annularly arranged spring dogs adapted to enter the notches in the nut, the spring dogs of the washer being so spaced apart with relation to the dog engaging shoulder of the nut, that only part of the dogs will engage some of the shoulders on the nut, while the remaining spring dogs will in part rest idly in the notches of the nut and out of engagement with the dog engaging shoulders, and means for preventing the washer from turning on the bolt, substantially as set forth.

In testimony whereof, I have signed this specification in the presence of two subscribing witnesses.

JAMES DE HAVEN.

Witnesses:
HENRY A. SHUFFLEBURGER,
W. F. PEAKE.